Nov. 19, 1963    P. PANHARD    3,111,043
DIFFERENTIAL TRANSMISSION
Filed Dec. 29, 1961    2 Sheets-Sheet 2
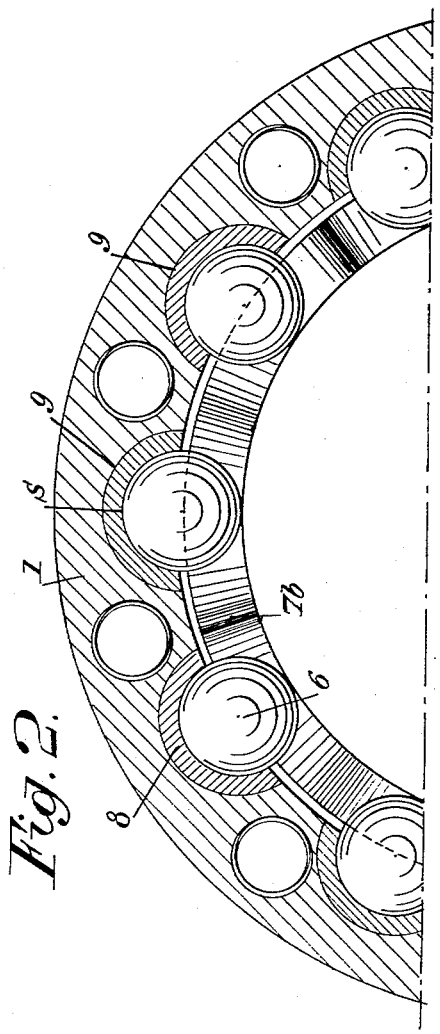
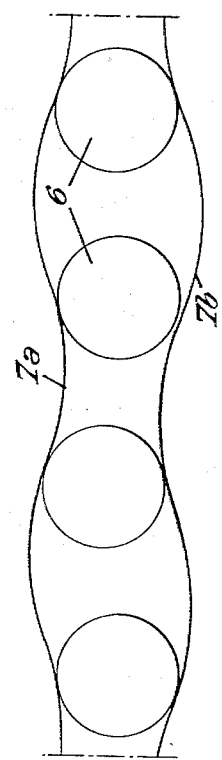
INVENTOR
BY
ATTORNEY

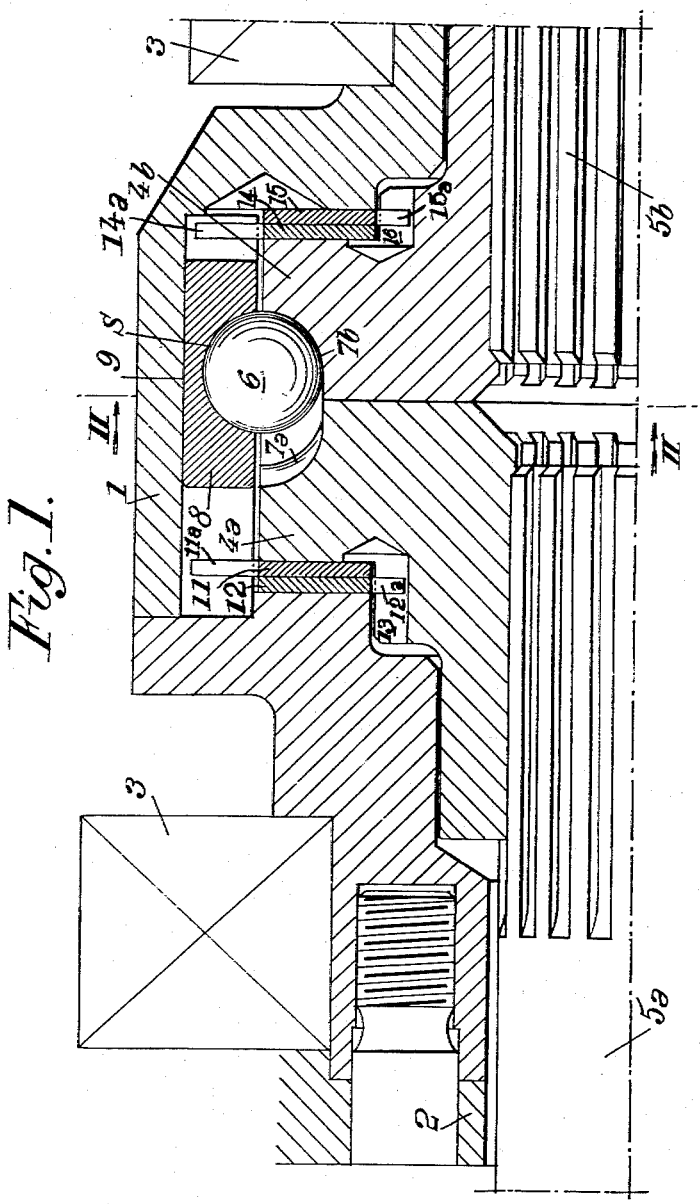

United States Patent Office 3,111,043
Patented Nov. 19, 1963

3,111,043
DIFFERENTIAL TRANSMISSION
Paul Panhard, Paris, France, assignor to Societe Anonyme des Anciens Etablissements Panhard & Levassor, Paris, France, a society of France
Filed Dec. 29, 1961, Ser. No. 163,188
Claims priority, application France Jan. 17, 1961
4 Claims. (Cl. 74—650)

The present invention relates to a differential transmission, particularly for a motor vehicle, comprising at least one driving element rotating about an axis of rotation and two driven elements mounted rotatable about the same axis and having respective undulated cam-shaped edge faces located opposite each other, movement being transmitted from said driving element to said driven element through a plurality of balls located between said undulated cam-shaped edge faces to cooperate therewith and carried by said driving member so that their centers are movable along generatrices of a cylindrical surface turning together with said driving member and co-axial therewith, the respective numbers of undulations of said edge faces being different from each other and from the number of said balls.

The object of this invention is to provide a differential transmission of this type which is better adapted to meet the requirements of practice than those known up to this time.

For this purpose, according to this invention, said balls are connected with said driving element through intermediate members, each of said balls having a portion of its surface engaged with a sliding fit in a corresponding spherical recess of one of said members, which is slidably mounted in said driving element so that the center of its recess is movable along one of said generatrices, respectively, all of these members being movable in rotation about said axis, together with said driving element.

A preferred embodiment of the present invention will be hereinafter described with reference to the accompanying drawings, given merely by way of example and in which:

FIG. 1 is an axial section of one half of a differential transmission for an automobile vehicle made according to the present invention;

FIG. 2 is a cross section on the line II—II of FIG. 1;

FIG. 3 is a developed partial view showing the arrangement of the balls with respect to the cam-shaped edge faces of the driven elements.

The differential transmission illustrated by the drawings and intended to be used on an automobile vehicle is intended to couple a driving element consisting of a casing 1 rotating together with a hollow driving shaft 2, and supported by bearings 3, to two driven elements consisting of annular discs $4_a$ and $4_b$ housed in casing 1, and rigid with the two coaxial shafts $5_a$ and $5_b$ respectively, which are themselves coupled with the corresponding wheels of the vehicle. These two shafts $5_a$ and $5_b$ must be driven in differential manner in some circumstances, for instance, when the vehicle is negotiating a curve.

The mechanism comprises an annular row of balls 6 driven in rotation about its axis by casing 1 and cooperating with the edges $7_a$ and $7_b$ of the two elements $4_a$ and $4_b$ which have undulated cam-shaped edges, as shown by FIG. 3.

It is known that in order to obtain the desired operation of such a differential transmission the number of balls 6 and the numbers of undulations provided respectively on edges $7_a$ and $7_b$ must be three different numbers chosen, for instance, in the two following sets of examples, the first of which seems more advantageous than the other one. In each of these sets of examples each line indicates three numbers which are respectively the number of undulations of one of the cam-shaped edges, the number of balls and the number of undulations of the other cam-shaped edge.

First Set of Examples (In this case the number of balls is comprised between twice the numbers of undulations of the two edges.)

7—15—8

8—17—9

5—11—6

(Case illustrated by the drawing.)

Second Set of Examples (Number of balls comprised between the two numbers of undulations.)

15—16—17

14—16—18

In the case of the first set, and considering successively the balls of the annular row, there is alternately a ball intended to insure the drive and a ball having a retaining function.

In the case of the second set there is found in the same conditions a half row of balls ensuring the drive and a half row of balls having a retaining function.

Whatever be the numbers that are chosen, the undulations of edges $7_a$ and $7_b$ are given, according to the invention, a smooth shape in the form of sinusoids as illustrated by FIG. 3, this arrangement making it possible to reduce the wear and tear of the edges.

A mechanism as above described may work in two different ways, according to the path followed by the vehicle.

When the vehicle is moving along a straight path, so that shafts $5_a$ and $5_b$ must rotate both at the same speed, these shafts are driven by some of the balls 6, which are wedged between opposite undulations of edges $7_a$ and $7_b$ respectively, this kind of operation being hereinafter called "normal operation."

When the vehicle is negotiating a curve, the two shafts $5_a$ and $5_b$ must rotate at different respective speeds and this will be hereinafter called "differential operation."

In the case of normal operation, the active balls 6 act as keys serving to couple driven elements $4_a$ and $4_b$ together imperatively, these balls 6 having exclusively a movement of rotation such as imparted thereto by the driving casing 1.

On the contrary, in the case of differential operation, the movement of each of the balls 6 is much more complicated because, in addition to the above mentioned general movement of rotation two movements are produced, as follows:

On the one hand, a pivoting movement of the ball about its center;

On the other hand, a rectilinear reciprocating movement of the center of the ball along a line parallel to the common axis of elements $4_a$ and $4_b$.

According to the present invention in order to permit in the best possible conditions the reciprocating movement of the balls, there is interposed, between every ball 6 and the inner wall of casing 1, an intermediate member 8 which will be called a shuttle. Every shuttle 8 is provided with a recess S opening toward the driven elements $4_a$ and $4_b$ and the wall of which is in the form of a portion of a sphere. All the shuttles 8 are rotated simultaneously about the common axis of elements 1, $4_a$ and $4_b$ by the fact that said shuttles are each mounted slidably in a slideway 9 provided in the inner wall of casing 1, these slideways being of course parallel to the above mentioned axis and of a sufficient length to permit the desired displacements of the shuttles. Annular clutch disc 11 provided with lugs such as 11$_a$ fitting in slideways 9 respectively is in frictional contact with annular clutch disc 12 provided with lugs such as 12$_a$ fitting in slideways 13 provided in driven member 4$_a$. In a likewise manner, an annular clutch disc 14 provided with lugs such as 14$_a$ fitting in slideways 9 respectively is in frictional contact with annular clutch disc 15 provided with lugs such as 15$_a$ fitting in slideways 16 provided in driven member 4$_b$.

Furthermore, according to the preferred embodiment of the invention, illustrated by the drawing, each of the balls is made of a diameter such that it is engaged in the area between the edges 7$_a$ and 7$_b$ of elements 4$_a$ and 4$_b$, but projects outwardly from said space so as to be housed with a sliding fit in the recess S of the corresponding shuttle 8. Thus the space between the edges of elements 4$_a$ and 4$_b$ is free and these elements may be mounted in contact with each other as illustrated by FIG. 1. Furthermore, the tracing of undulations 7$_a$ and 7$_b$ is such that the reciprocating movement of balls 6 may have an amplitude as great as the diameter of said balls.

In the construction illustrated by the drawing, every shuttle 8 is in the form of a cylindrical sector, as visible on FIG. 2, the spherical recess S opening into the flat face of this sector. The driving grooves 9 have a cross section in the form of a circular arc of a radius substantially equal to that of the cylindrical wall of shuttle 8.

Owing to the provision of shuttles 8 between balls 6 and driving element 1, the pivoting and reciprocating movements of the balls correspond to distinct friction areas and each of the parts in relative movements has a substantial contact area. These distinct zones are for the pivoting movement the spherical wall of recess S and for the reciprocating movement the groove 9 in which the shuttle is slidably guided.

This distribution of the two movements between distinct surfaces having substantial areas, each corresponding to a simple movement (pivoting and sliding movements), permits of reducing wear and tear considerably.

In a general manner, while I have, in the above description, disclosed what I deem to be a practical and efficient embodiment of my invention, it should be well understood that I do not wish to be limited thereto as there might be changes made in the arrangement, disposition and form of the parts without departing from the principle of the present invention as comprehended within the scope of the accompanying claims.

What I claim is:

1. A differential transmission which comprises, in combination, a driving element rotatable about an axis, two driven elements rotatable about said axis and a plurality of reciprocating members carried by said driving element, each of said members being provided with a recess opening toward said driven elements, the walls of said recesses having the shape of sphere portions all of the same diameter, said members being driven in rotation together with said driving element but being slidable longitudinally with respect thereto so that the centers of their respective spherical recesses move along lines parallel to said axis and all at the same distance therefrom, said driven elements having respective undulated cam-shaped edge faces located opposite each other, the respective numbers of the undulations of said cam-shaped edges being different from each other and from the number of said members and a plurality of balls each slidably fitted in one of said recesses respectively and being located between said undulated cam-shaped edge faces of said driven elements so as to cooperate therewith to transmit movement from said driving element to said driven elements.

2. A differential transmission which comprises, in combination, a driving element rotatable about an axis and having a peripheral wall of general cylindrical shape, two driven elements rotatable about said axis and having respective peripheral walls of general cylindrical shape located opposite said driving element peripheral wall, a plurality of reciprocating members carried by said driving element peripheral wall, each of said members being provided with a recess opening toward said driven elements peripheral walls, the walls of said recesses having the shape of sphere portions all of the same diameter, said members being driven in rotation together with said driving element but being slidable longitudinally with respect thereto so that the centers of their respective spherical recesses move along lines parallel to said axis and all at the same distance therefrom, said driven elements having respective undulated cam-shaped edge faces located opposite each other, the respective numbers of the undulations of said cam-shaped edges being different from each other and from the number of said members, and a plurality of balls each having a portion thereof slidably fitted in one of said recesses respectively and another portion located between said undulated cam shaped edge faces of said driven elements so as to cooperate therewith to transmit movement from said driving element to said driven elements.

3. A differential transmission according to claim 2 wherein said peripheral wall of said driving element surrounds said peripheral walls of said driven elements.

4. A differential transmission according to claim 1, wherein the undulations of the edges of the driven elements are smooth shaped and similar to sinusoids.

References Cited in the file of this patent

UNITED STATES PATENTS

| 2,179,923 | De Lavand | Nov. 14, 1939 |
| 2,440,975 | Robbins | May 4, 1948 |
| 2,651,214 | Randall | Sept. 8, 1953 |
| 2,938,407 | Nallinger et al. | May 31, 1960 |
| 3,018,672 | Altmann | Jan. 30, 1962 |